May 27, 1924.
J. FRASER
1,495,171
CHASSIS FOR VEHICLES
Filed April 6, 1923
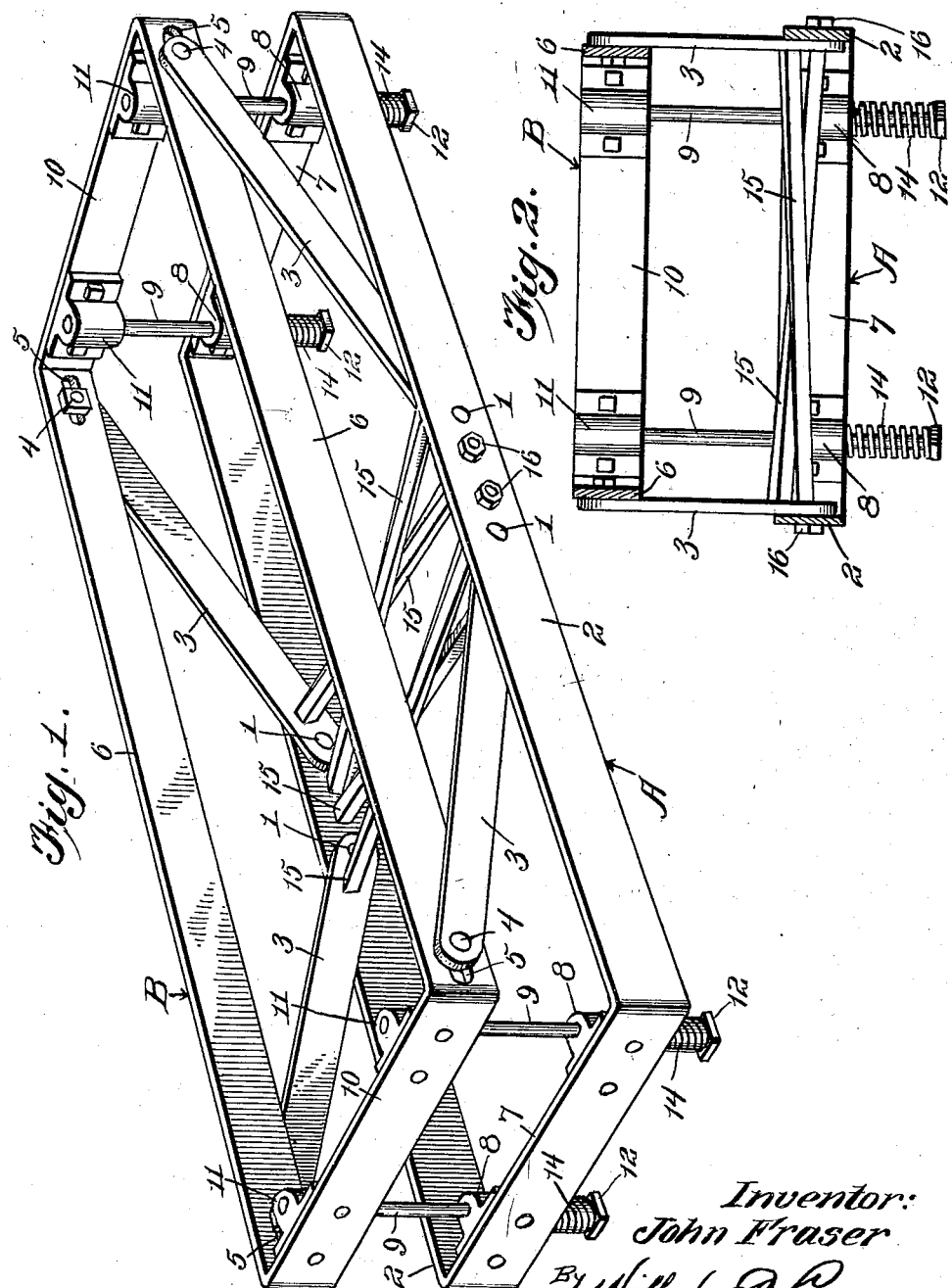

Patented May 27, 1924.

1,495,171

UNITED STATES PATENT OFFICE.

JOHN FRASER, OF BROOKLYN, NEW YORK.

CHASSIS FOR VEHICLES.

Application filed April 6, 1923. Serial No. 630,292.

*To all whom it may concern:*

Be it known that I, JOHN FRASER, a citizen of the United States, residing at Brooklyn, in the county of Kings and State of New York, have invented certain new and useful Improvements in Chassis for Vehicles, of which the following is a specification.

This invention relates to a chassis for vehicles and it is an object of the invention to provide a novel and improved device of this general character wherein two relatively movable frames are employed, said frames being operatively connected in a manner whereby the shocks and jars incident to travel are materially reduced.

It is also an object of the invention to provide a novel and improved device of this general character comprising two relatively movable frames and wherein members subject to torsion strain are provided to afford the requisite spring action to said frames of the chassis.

The invention consists in the details of construction and in the combination and arrangement of the several parts of my improved chassis for vehicles whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective of a chassis constructed in accordance with an embodiment of my invention; and Figure 2 is a transverse sectional view taken through the structure as illustrated in Figure 1.

As herein disclosed, my improved chassis comprises two superimposed frames A and B, each of said frames being of any desired dimensions and configuration but herein disclosed as rectangular. In practice the lower frame A is adapted to support the mechanism of a motor driven vehicle while the upper frame B is adapted to have the body and engine of the vehicle mounted thereon. Pivotally connected as at 1 with the central portion of each of the side members 2 of the frame A are the adjacent end portions of a pair of oppositely directed rigid links or lever arms 3, each of said arms normally extending upward on a predetermined incline and are provided with an inwardly directed pin or bolt 4 slidably disposed through a slot 5 produced in an end portion of a side member 6 of the upper frame B. By this means the frames A and B are capable of movement one relative to the other.

Each of the end members 7 of the lower frame A is provided with a pair of inwardly arranged bearings 8 through which are slidably disposed the rods 9 depending from the adjacent end member 10 of the upper or second frame B. The upper end portions of each of the bars 9 is rigidly secured to an inwardly directed member or bracket 11 carried by said end member 10 of the frame B. Each of the bars 9 extends below the frame A and is provided at its lower extremity with a head or enlargement 12 which may be a nut or other suitable member. Interposed between said enlargement or head 12 and the bearing 8 directly thereabove is a spring 14 encircling the bar 9. The springs 14 serve to absorb the shocks which would otherwise occur upon the upward movement of the frame B and coact with the bars 9 to limit the extent of upward movement of said frame B.

Rigidly secured to each of the links or lever arms 3 at a point in relatively close proximity to its pivotal connection 1 is a torsion bar 15 which is preferably a square equilateral in cross section and normally straight, the opposite end portion of the bar 15 is permanently secured as at 16 to the member 2 of the frame A remote from the link or lever arm 3 with which said bar is connected, said connection 16 being inwardly of the pivotal connection 1 of the corresponding link or lever arm 3 at said opposite side of the frame A. In the assembly the bars 15 associated with links or lever arms at similar ends of the chassis assembly are in cross relation as is believed to be clearly disclosed in the accompanying drawings.

In assembling my improved chassis a bar 15 is connected to a link or lever arm 3 when the same is free of the frame B and in substantially a horizontal position. When this connection has been made between a bar 15 and the arm 3, said arm 3 is swung upwardly and operatively engaged with a side member 6 of the frame B. This results in a torsion spring strain in the bar 15 which supports the upper frame B whereby said frame B through the instrumentality of all four of the bars 14 is supported in a way that will give a sensation as if suspended in the air and reduce the deterioration of a vehicle and particularly a motor driven vehicle by modifying the shocks and jars incident to travel.

From the foregoing description it is thought to be obvious that a chassis for vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A vehicle chassis comprising a pair of superimposed frames, rigid links operatively connecting and engaging said frames, whereby said frames are supported for movement one relative to the other, and a torsion bar connected with each of the links and with one of the frames.

2. A vehicle chassis comprising a pair of superimposed frames, rigid links operatively connecting and engaging said frames, whereby said frames are supported for movement one relative to the other, a torsion bar connected with each of the links and with one of the frames, and means for limiting the relative movement of the frames in a direction one away from the other.

3. A vehicle chassis comprising a pair of superimposed frames, rigid links operatively connecting and engaging said frames, whereby said frames are supported for movement one relative to the other, and a torsion bar connected with each of the links and with one of the frames, the links being arranged in pairs at each side of the frames.

4. A vehicle chassis comprising a pair of superimposed frames, rigid links operatively connecting and engaging said frames, whereby said frames are supported for movement one relative to the other, and a torsion bar connected with each of the links and with one of the frames, the links being arranged in pairs at each side of the frames and disposed in opposite directions.

5. A vehicle chassis comprising a pair of superimposed frames, rigid links operatively connecting and engaging said frames, whereby said frames are supported for movement one relative to the other, a torsion bar connected with each of the links and with one of the frames, means for limiting the relative movement of the frames in a direction one away from the other, and shock absorbing means associated with the first named means.

In testimony whereof I affix my signature.

JOHN FRASER.